United States Patent [19]
Dolling et al.

[11] 3,941,433
[45] Mar. 2, 1976

[54] FLEXIBLE BEARING HAVING LOW TORQUE RESISTANCE

[75] Inventors: William T. Dolling; Jack R. Kapp, both of Brigham City, Utah

[73] Assignee: Thiokol Corporation, Newtown, Pa.

[22] Filed: May 5, 1975

[21] Appl. No.: 574,674

[52] U.S. Cl.............. 308/2 R; 308/26; 308/237 R; 308/DIG. 8; 267/152
[51] Int. Cl.² ............................................ F16C 7/00
[58] Field of Search ............ 308/2 R, 2 A, 3 R, 5 R, 308/26, 237 R, DIG. 8; 267/152, 63 R, 57.1 R; 248/24, 188.8, 350; 14/16

[56] References Cited
UNITED STATES PATENTS

| | | |
|---|---|---|
| 3,228,673 | 1/1966 | Hinks................................. 308/26 |
| 3,429,622 | 2/1969 | Lee et al. ........................... 308/2 R |
| 3,449,031 | 6/1969 | Josephson ...................... 308/237 R |
| 3,544,176 | 12/1970 | Slater ................................. 308/3 R |

Primary Examiner—M. H. Wood, Jr.
Assistant Examiner—Gene A. Church
Attorney, Agent, or Firm—Stanley A. Marcus; Edward E. McCullough

[57] ABSTRACT

A flexible bearing is constructed of layers of elastomer and rigid material, alternately stacked and bonded together. The central portion of each elastomeric layer, however, is an elastomeric material having a lower elastic shear modulus than that of the edge portions. This lowers the resistance of the bearing to forces exerted on it in directions parallel to the layers of elastomer and rigid material.

5 Claims, 2 Drawing Figures

FLEXIBLE BEARING HAVING LOW TORQUE RESISTANCE

BACKGROUND OF THE INVENTION

This invention relates broadly to flexible bearings, and more specifically to bearings that are constructed of alternate layers of elastomer and rigid materials, stacked and bonded together; so that they are flexible in directions parallel to the layers, but are relatively unyielding in directions perpendicular thereto. This invention described herein was made during the course of or under Contract Number N0003072C0108 with the U.S. Navy.

The type of flexible bearing comprising alternate layers of rigid material and elastomer has many uses, including applications to motor mounts and bridge abutments. More recently, it has been found to be useful for mounting a movable thrust nozzle to a rocket, so that the nozzle may be rotated from side to side for steering the rocket. A typical arrangement of the bearing for this use is shown in FIG. 3 of U.S. Pat. No. 3,429,622 to R. E. Lee, et al, wherein the bearing is labeled "10."

Other U.S. Pats. showing this type of flexible bearing are Nos. 3,390,899 to J. T. Herbert, et al; 3,504,902 and 3,504, 903 to A. S. Irwin; and 3,504,904 to A. S. Irwin, et al.

Although this type of bearing functions very well for the above purpose, it has been found that the layers of elastomer tend to act as springs that resist the torques exerted on the bearing by the nozzle actuators (usually hydraulic cylinders, each attached at one end to the rocket nozzle and at the other end to the rocket case). These layers of elastomer tend to maintain the thrust nozzle in a position of alignment with the axis of the rocket and to resist side forces thereon in accordance with Hooke's Law, i.e. the resistance increases with the angular distance of the nozzle from its axial alignment. This resistance necessitates the use of larger, heavier, more powerful actuators than certain other means of mounting the nozzle require.

SUMMARY OF THE INVENTION

Hence, it is a primary object of the present invention to provide a flexible bearing that will afford all of the advantages of conventional, flexible bearings for mounting movable thrust nozzles to rockets; but that will be more yielding to side forces exerted thereon, so that smaller, lighter-weight actuators may be used.

The invention is essentially a flexible bearing constructed of alternate layers of rigid material and elastomer, stacked and bonded together, wherein the central portion of each elastomeric layer is a low, shear-modulus material. This lowers the total shear modulus of the bearing, rendering the bearing much more yielding to forces impressed on it in directions parallel to the layers.

In its application as a means for mounting a movable thrust nozzle to a rocket case, the bearing is annular in form. Also, the layers of elastomer and rigid material are shaped to conform to surfaces of concentric spheres, so that the thrust nozzle may be rotated about a fixed point. This is desirable for precision control of the rocket.

Important features of the invention are that it is simple and reliable in construction and easy to manufacture.

Other objects and advantages of the invention may become apparent as the following detailed description is read with reference to the drawings. The same numbers refer to the same parts throughout the disclosure.

DESCRIPTION OF THE PREFERRED EMBODIMENTS

Figure 1:
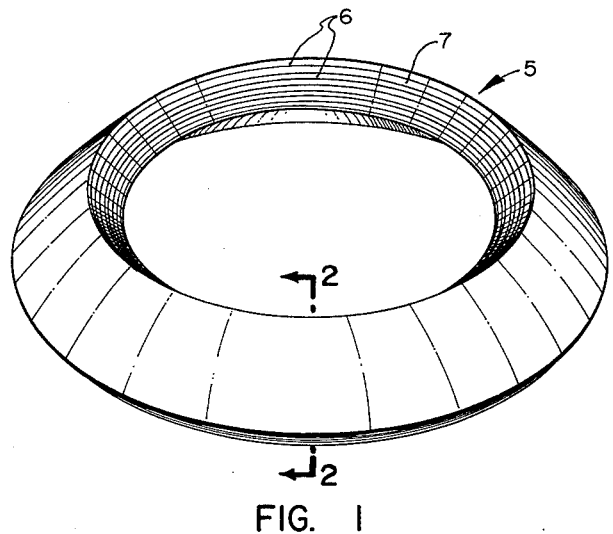
FIG. 1 is a perspective view of the invention.

As shown in the Figures, the invention is an annular, flexible bearing 5, constructed of alternate layers of elastomer 6 and rigid shims 7, stacked and bonded together. As used herein, the term "elastomer" refers to any flexible, stretchable material, including natural rubber. Each elastomeric layer 6 is made of two materials having different shear properties. A preferred material for the edge portions 8 of the elastomeric layers 6 is a firm, natural rubber formulation having good elastic and holding properties, and a shear modulus of about 20, such as the following, wherein the ingredients are listed according to parts by weight:

|  | Composition I | Composition II |
| --- | --- | --- |
| natural rubber | 88.5 | 88–90 |
| Hycar (synthetic rubber) | 17.5 | 13.12 |
| zinc oxide | 5.0 | 5.0 |
| stearic acid | 3.0 | 3.0 |
| phenyl-$\beta$-naphthyl-amine | 1.2 | 1.2 |
| sulfur | 1.25 | 0.5 |
| benzothiazyldisulfide | 0.75 | 0.75 |
| methyltuads | 0.1 | 0.1 |
| carbon black |  | 1.0 |

A preferred material for the central portions 9 of the elastomeric layers 6 is a silicone rubber having an elastic shear modulus of less than 10.

The embodiment shown in the Figures is adapted for use as a flexible joint between a rocket case and a movable thrust nozzle therefor. As such, it is annular in form; and the rigid shims 7 conform to surfaces of concentric spheres, so that the thrust nozzle (not shown) is rotatable about a fixed point. This promotes precision control of steering for the rocket. Hence, each rigid shim 7 conforms to the surface of a sphere having its own, unique radius. Perferably, these rigid shims are made of a high-temperature steel.

Figure 2:
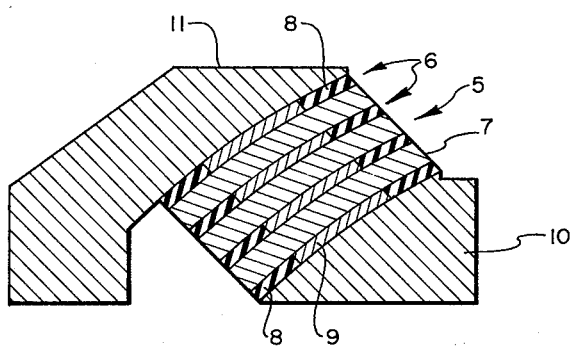
FIG. 2 is a cross section taken on line 2—2 of FIG. 1, including adjacent parts of the rocket to show mounting means.

As shown in FIG. 2, the top and bottom layers 6 of elastomer may be bonded directly to adjacent parts, such as the thrust-nozzle mounting ring 10 and the rocketcase mounting ring 11.

In manufacture, the rigid shims 7 are formed by any of a number of well-known techniques, selected as appropriate for the particular material and its thickness. The finished shims 7 may then be coated with an appropriate bonding agent to create a firm bond with the layers 6 of elastomer. If the elastomer is of such a nature that it may form a tight bond with the shims 7 or application of heat and pressure, the adhesive coating may not be necessary.

A plurality of sets of three concentric rings of elastomer are then cut from calendered elastomer of uniform thickness. The number of sets depends on whether the end layers of the bearing 5 are to be elastomeric (as shown in FIG. 2), rigid shims, or one of each. The central ring 9 of each set of three rings is of a lower, shear-modulus material than that of the outer rings 8. The elastomeric layers 6, each comprising a set of three concentric rings, are then stacked alternately with the rigid shims 7; and the entire bearing is firmly bonded together by application of heat and pressure. Spacers, not shown, are placed between the edges of the rigid shims 7 before this operation, to insure uniform thickness of the elastomeric layers 6. The outer-edge portion of the flexible bearing that contains the spacers is later removed by machining.

The elastic material used for the edges 8 of the elastomeric layers 6 is strong enough to contain the low, shear-modulus material used for the central portions 9, and to prevent extrusion thereof from between the rigid shims 7 when compressive force is applied to the bearing; e.g., by propulsive gases inside the rocket motor.

Because of the presence of the low, shear-modulus material 9 in the bearing 5, this bearing is significantly less resistant to side forces or torques applied to the bearing. In a rocket, side forces are applied to the bearing 5, parallel to the layers thereof, by hydraulic actuators that move the thrust nozzle relative to the rocket case to steer the rocket. The bearing 5 has substantially the same resistance as conventional, flexible bearings to compressive loads impressed thereon by propulsive gases of the rocket. However, since the bearing 5 is more yielding to torques applied to the thrust nozzle by hydraulic actuators, these actuators may be considerably smaller and lighter in weight than would otherwise be necessary. The resulting decrease in the weight of inert parts permits either an increase in range or payload, or both, for the rocket.

An invention has been described that advances the art of flexible bearings. Although the preferred embodiment has been described specifically with regard to detail, it should be noted that many details may be altered without departing from the scope of the invention, as it is defined in the following claims.

The invention claimed is:

1. In a flexible bearing constructed of alternate layers of rigid material and elastomer stacked and bonded together, the improvement wherein the central portion of each layer of elastomer is of a lower, shear modulus of elasticity than the elastomer at the edge portions thereof, whereby the bearing is more yielding to forces parallel to the layers.

2. The flexible bearing of claim 1 having an annular form.

3. The flexible bearing of claim 2 wherein the layers of elastomer and rigid material conform to surfaces of concentric spheres.

4. The flexible bearing of claim 1 wherein the edge portions of the elastomeric layers is a natural rubber and the central portions is a silicone rubber.

5. A flexible bearing for mounting a movable thrust nozzle to a rocket comprising:
   a plurality of rigid, annular shims, axially aligned, uniformly spaced apart, and conforming to surfaces of concentric spheres; and
   an annular layer of elastomer between each pair of adjacent shims and bonded thereto, each layer comprising a set of three concentric, contiguous rings of rubber — the inner and outer rings of each set being of a natural rubber, and the central ring being a silicone rubber having a lower, shear modulus of elasticity than the inner and outer rings.

* * * * *